United States Patent [19]

Harmon

[11] Patent Number: 4,705,918

[45] Date of Patent: Nov. 10, 1987

[54] CORONA SHIELD AND TRANSMISSION LINE PROVIDED WITH CORONA SHIELDS

[75] Inventor: Eldred R. Harmon, Pell City, Ala.

[73] Assignee: Square D Company, Palatine, Ill.

[21] Appl. No.: 891,998

[22] Filed: Jul. 31, 1986

[51] Int. Cl.[4] .......................... H02G 5/02; H01T 19/02
[52] U.S. Cl. ................................. 174/73 R; 174/99 E; 174/144
[58] Field of Search .................. 174/73 R, 86, 99 E, 174/127, 140 R, 140 CR, 141 R, 144; 339/9 E, 143 C; 361/137

[56] References Cited

U.S. PATENT DOCUMENTS

| 1,870,781 | 8/1932 | Miller | 174/141 R |
| 3,530,264 | 9/1970 | Gorin et al. | 174/144 X |

FOREIGN PATENT DOCUMENTS

| 243347 | 11/1965 | Austria | 174/144 |
| 398728 | 3/1966 | Switzerland | 174/144 |

Primary Examiner—Laramie E. Askin
Attorney, Agent, or Firm—Stephen A. Litchfield

[57] ABSTRACT

A corona shield assembly for connection to various portions of a transmission line subassembly having two sets of oppositely mounted corona shields, each corona shield being bolted directly to a portion of the transmission line subassembly such that the corona shields extend substantially over the subassembly portion of the transmission line. A pair of bolts mate with holes in the individual corona shields and with corresponding aligning holes in the transmission line subassembly to mount the corona shields over the desired portions of the transmission line subassembly.

14 Claims, 9 Drawing Figures

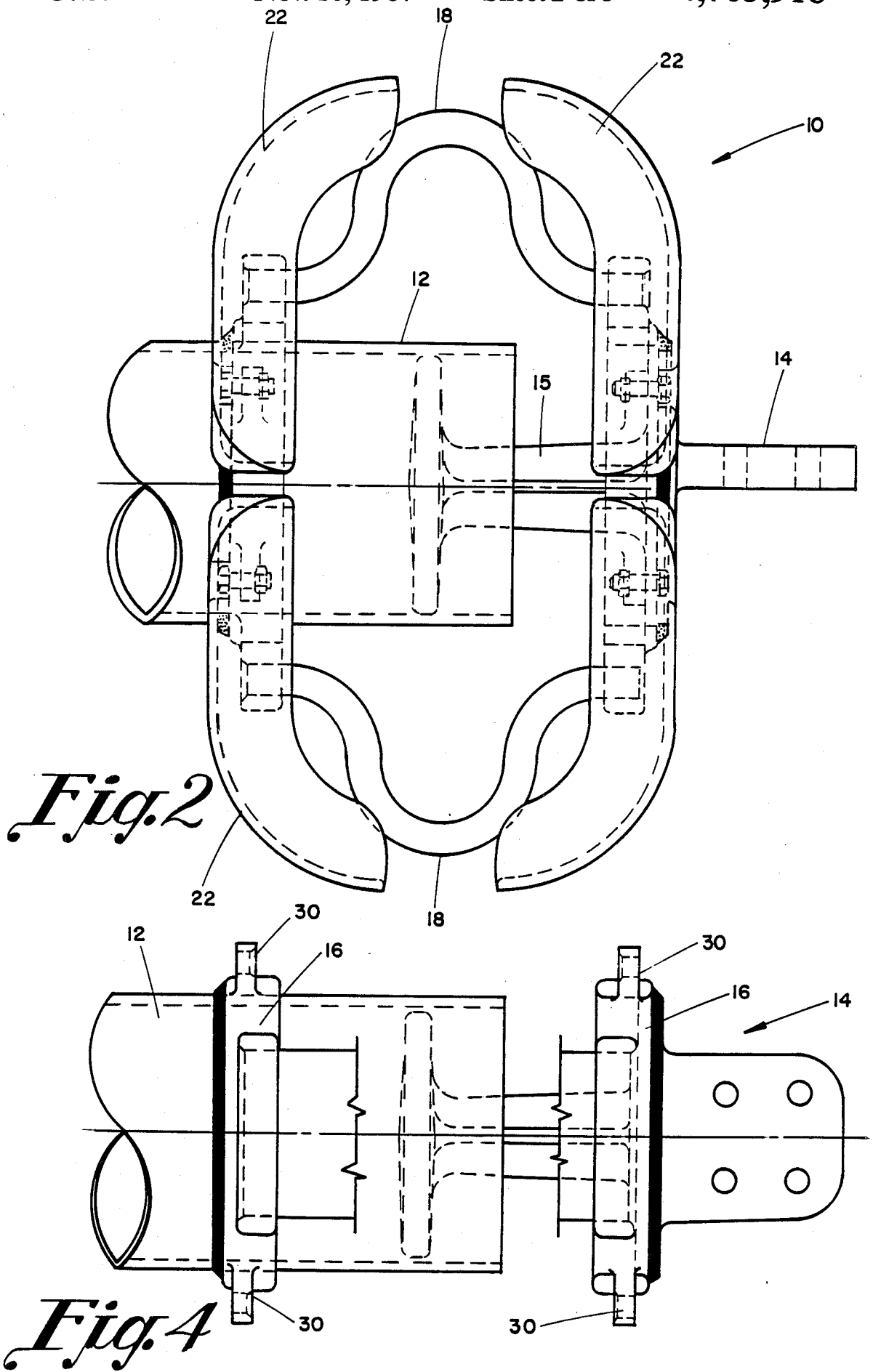

CORONA SHIELD AND TRANSMISSION LINE PROVIDED WITH CORONA SHIELDS

BACKGROUND OF THE INVENTION

This invention relates to corona shield assemblies for mounting with transmission line assemblies for the prevention of corona at assembly locations. More specifically, this invention relates to apparatus for shielding expansion type terminal connectors from corona.

Prior art corona ring or shield assemblies previously have consisted of cylinders mounted around a bus support terminal, or tubular circular rings mounted in parallel adjacent a bus support terminal fitting. Both prior art corona ring or shield applications have been unwieldy in terms of size and weight and in some cases must be assembled prior to final assembly of the terminal fitting on the transmission line. The tubular circular corona rings of the past design, to properly protect against the effects of corona, have been very large with respect to the terminal fitting. This not only is unsightly and creates difficulties in installation and maintenance but also adds to expense in the form of materials and labor and requires an undue amount of inventory space for factory storage.

Thus, there is a need in the field for a lightweight, relatively inexpensive and compact corona shield assembly to be used in connection with a variety of transmission line subassemblies for the protection from the effects of corona. Further, there is a need in the field for a corona shield assembly that may be assembled in the field after the transmission line subassembly has been connected and installed. Additionally, there is a need in the field for a corona shield assembly that allows access to the transmission line terminal subassembly for maintenance and other service work.

SUMMARY OF THE INVENTION

The improved corona shield assembly of the present invention comprises a series of two sets of oppositely mounted corona shields, each corona shield having an identical size and shape to its opposing member. The corona shields are individually mounted to transmission line subassemblies such as expansion type bus support terminal assemblies, but support assemblies of the expansion type, and coupler assemblies. The individual corona shields extend from the mounting portion of the transmission line subassembly to just over the expansion portion of the terminal connection, thereby providing an adequate protection from the effects of corona. Each corona shield is formed in a manner such that its central portion is removed, thereby conserving on weight and material and, hence, manufacturing costs. Each corona shield may be made from the same mold, without regard to its position in connecting to the transmission line subassembly. In the embodiment disclosed herein the corona shields are connected to the transmission line subassembly by means of a series of bolts and nuts intersecting with openings in the corona shields and like openings in the transmission line subassemblies.

The corona shields may be installed after the bus support terminal assemblies have been erected, as the final item of the terminal assembly. Also, on an expansion type terminal assembly as the bus supports expand and contract with weather change, the corona shield moves accordingly since it is connected at opposite ends of the expansion terminal assemblies.

The corona shields of the present invention prove to be more compact than those used in the prior art, and are able to be maintained once mounted on the expansion terminal assemblies by simply removing the bolts that connect the corona shield to the transmission line subassemblies. Further, the corona shields of the present invention reduce inventory storage requirements at the manufacturing location. Thus, it is believed that the corona shields of the present invention provide increased benefits over those of the prior art and solve the problems inherent in the design of prior art corona rings and shields.

Further objects and advantages of the invention will in part become apparent as the following description proceeds. The features of novelty which characterize the invention will be pointed out with particularity in the claims annexed to and forming a part of the specification.

BRIEF DESCRIPTION OF THE DRAWINGS

The features of the present invention which are believed to be novel are set forth with particularity in the appended claims. The invention, together with further objects and advantages thereof, may best be understood by reference to the following description, taken in conjunction with the accompanying drawings in the several figures of which like reference numerals identify like elements and in which:

FIG. 2 is a side view of the corona shields of the present invention shown connected to a bus support expansion terminal assembly;

FIG. 4 is a top view of the bus support expansion terminal assembly without the corona shields attached;

DETAILED DESCRIPTION

Figure 1:
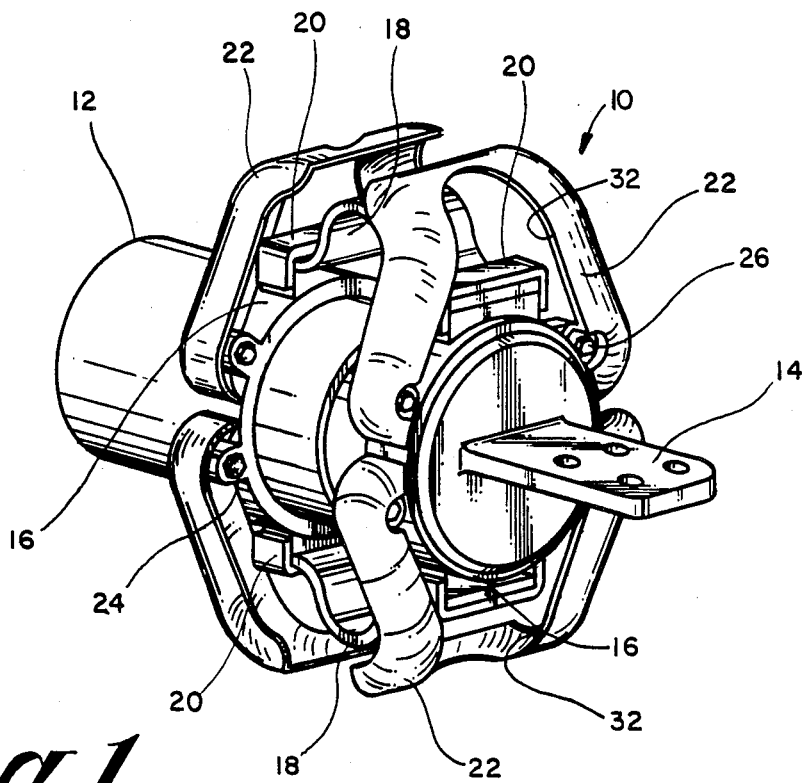
FIG. 1 is a perspective view of the corona shields of the present invention connected to a bus support expansion terminal assembly.

FIG. 1 of the drawings illustrates, in side perspective view, the transmission line subassembly 10 having connected thereto bus 12, and terminal assembly 14. Terminal assembly 14 comprises a set of collars 16 joined together by an expansion strap 18, at each end thereof. Expansion straps 18 are held in place over collars 16 by virtue of retaining members 20. Corona shields 22 are shown attached to the collars 16 by virtue of nuts and bolts 24 and 26. Nuts and bolts 24 and 26 project through openings 28 (see FIG. 9) in corona shields 22 and intersect with like openings 30 (see FIG. 4) in collars 16. It should be noted that corona shields 22 have a rounded shape extending substantially over the expansion straps 18 between the bus support 12 and the terminal assembly 14. Also, it should be noted that the corona shields 22 have inner open areas 32 in the central portion thereof. These central open areas 32 permit the corona shields 22 to be manufactured out of a relatively small amount of material and render them lightweight and therefore of economical manufacture. FIG. 1 illustrates the relatively compact design of the installed corona shields over an expansion type terminal assembly.

FIG. 2 shows in more detail, in side view, the transmission line subassembly 10. It is seen that terminal assembly 14 has projection 15 which extends into bus 12 through a central opening therein. This arrangement in combination with the expansion straps 18 allows for the expansion and contraction of the bus 12 in temperature changes. Thus, the terminal assembly 14 allows the bus 12 as well as one set of oppositely mounted corona shields 22 to move over the projection 15 during temperature increases and decreases. This prevents the corona shield assembly of the present invention from interfering with the expansion of the terminal assembly or with the providing of a secure electrical contact for the transmission of electric power.

Figure 3:
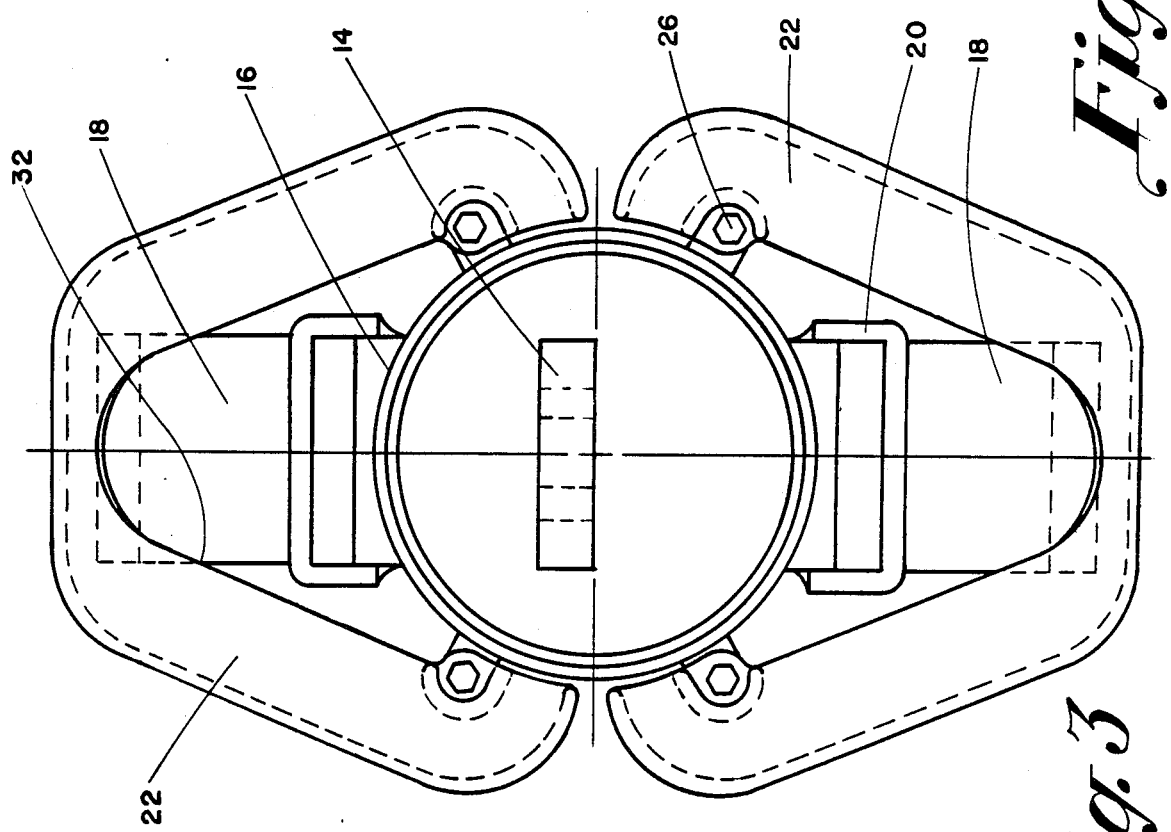
FIG. 3 is an end view of the corona shield shown connected to a bus support expansion terminal assembly.

FIG. 3 illustrates in end view, the terminal assembly 14 connected to the bus 12 by means of collar 16 and expansion straps 18. The substantial amount of area that is removed in opening 32 in corona shield 22 should be noted. Again, this provides for a lightweight, economically manufactured corona shield. FIG. 4 illustrates the bus 12 and terminal assembly 14 without the corona shield 22 installed. Collar openings 30 which receive the bolts 26 for securing the corona shields 22 thereto are shown in detail. Each collar 16 has four openings 30 therein such that each collar 16 may receive a pair of oppositely mounted corona shields 22.

Figure 6:
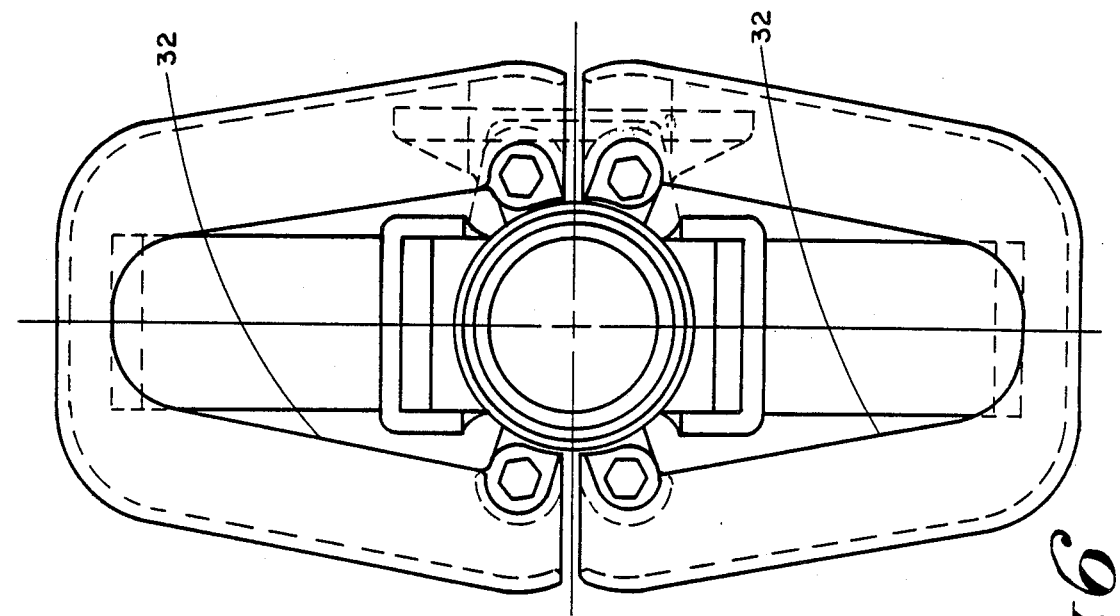
FIG. 6 is an end view of a modified design corona shield assembly connected to an expansion bus support.
Figure 5:
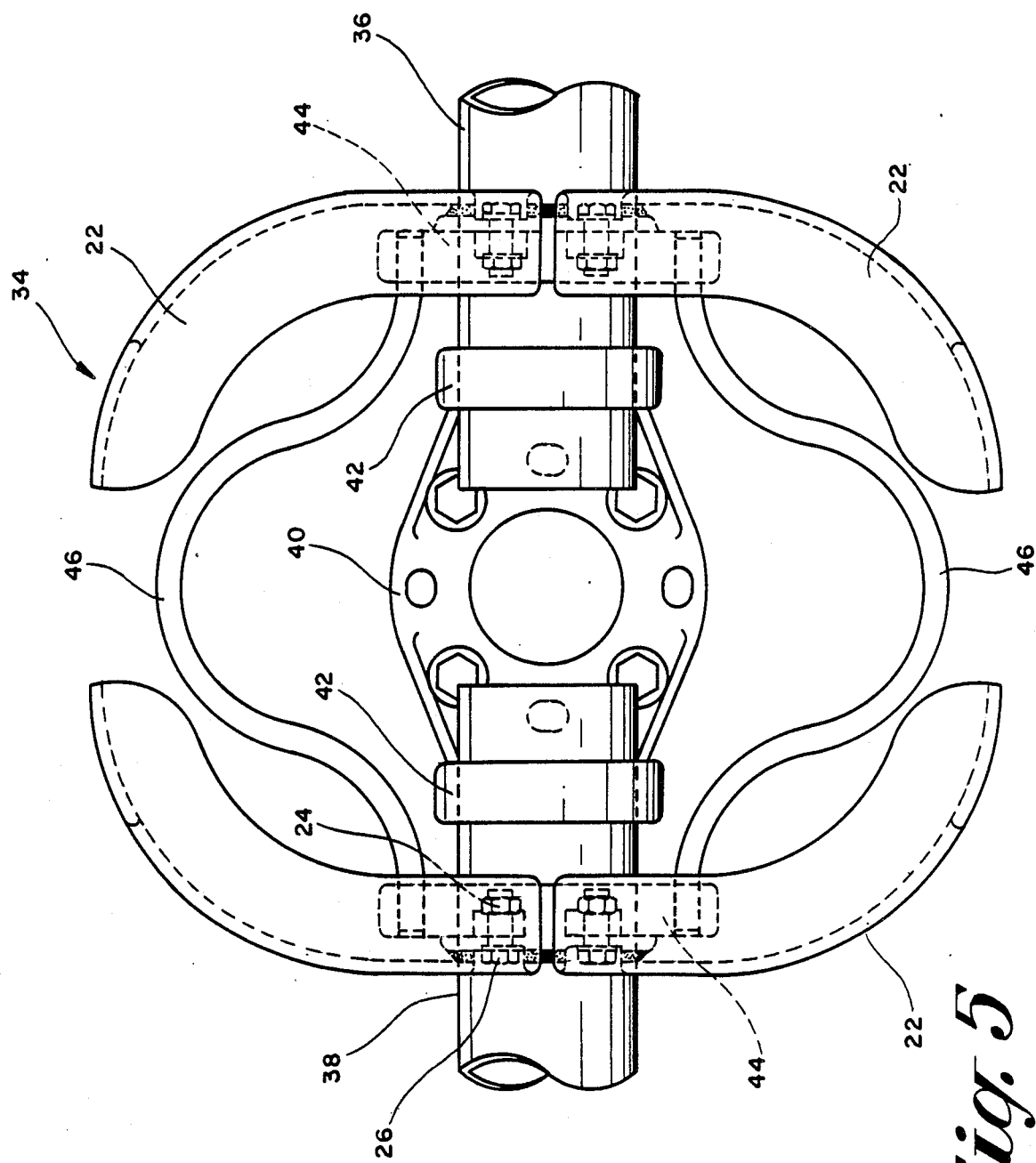
FIG. 5 is a top view of a corona shield assembly connected to an expansion bus support assembly.

The corona shield assembly of the present invention may be used with a variety of other transmission line subassemblies. For example, in FIG. 5, the corona shield assembly is shown connected to an expansion bus support assembly or juncture 34. Expansion bus support assembly 34 has bus 36 and bus 38 connected to the bus support 40. Bus support 40 is of an expansion type having rings 42 through which busses 36 and 38 project. Collars 44 are mounted over busses 36 and 38 to support expansion straps 46. Corona shields 22 are connected to collars 44, again, by virtue of nuts 24 and bolts 26. It should be noted that the corona shields extend substantially over the expansion bus support assembly 34 and, due to their connection to the collars 44, will move with the expansion straps 46 as the individual busses 36 and 38 expand and contract due to weather changes. FIG. 6 illustrates the expansion bus support assembly 34 having corona shields 22 of modified design secured thereto in end view. Again, a substantial area 32 is removed from the interior portion of the corona shields 22 thereby rendering the shields lightweight and of an economical manufacture. The change in design of shields 22 shown in FIG. 6 over the shields 22 shown in FIG. 3 illustrates the applicability of the present invention to different types of transmission line assemblies and to different sized busses and supports. In all of the applications shown herein the corona shields 22 take up little additional space over the transmission line assemblies. This is unlike prior art corona ring or shield assemblies which were either heavy cylindrically shaped tubes or circular tubes of an unduly large size.

Figure 7:
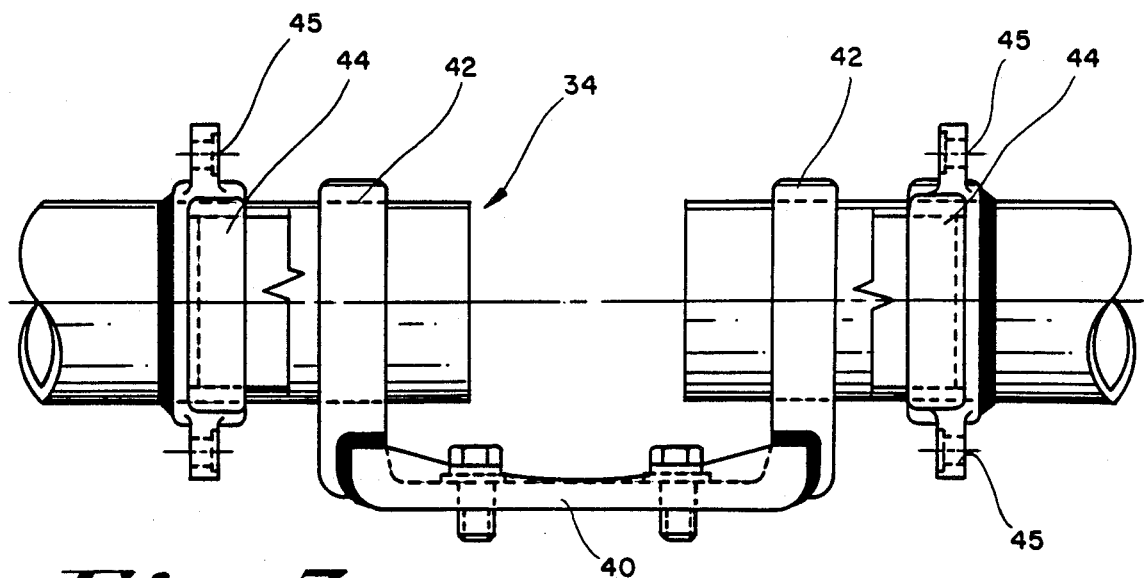
FIG. 7 is a side view of the expansion bus support assembly without the corona shield installed.

FIG. 7 shows the expansion bus support assembly 34 without the corona shields attached, thereby showing in detail openings 45 in collars 44 which permit securing the corona shields 22 to the collars 44. Both FIG. 7 and Fig. 4 illustrate the ease of assembly of the corona shields 22 to the transmission line assembly once the assembly has already been installed. Also, FIGS. 4 and 7 illustrate that the corona shields 22 need only be bolted to the already assembled collars of the respective subassemblies to be mounted in place for protection against the effects of corona. During maintenance of the transmission line subassemblies, these shields may easily be removed by removing the nuts and bolts 24 and 26 to facilitate maintenance of the terminal assembly. Further, in the event that an individual corona shield is damaged, it is easily replaced without disassembly of the entire apparatus.

Figure 8:
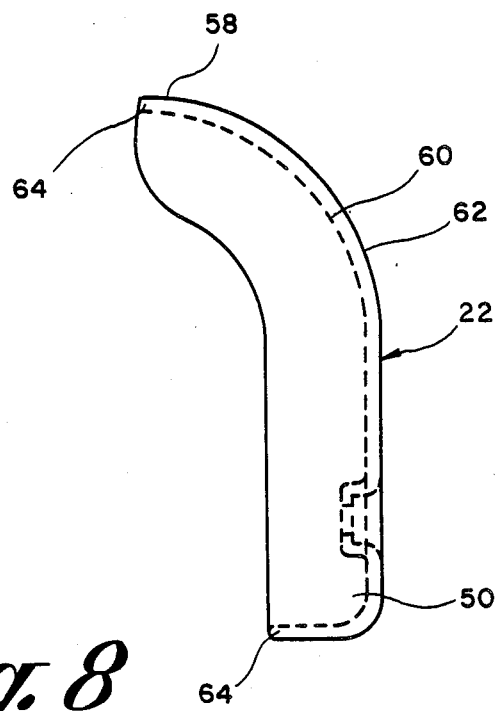
FIG. 8 is a side view of a single corona shield.
Figure 9:
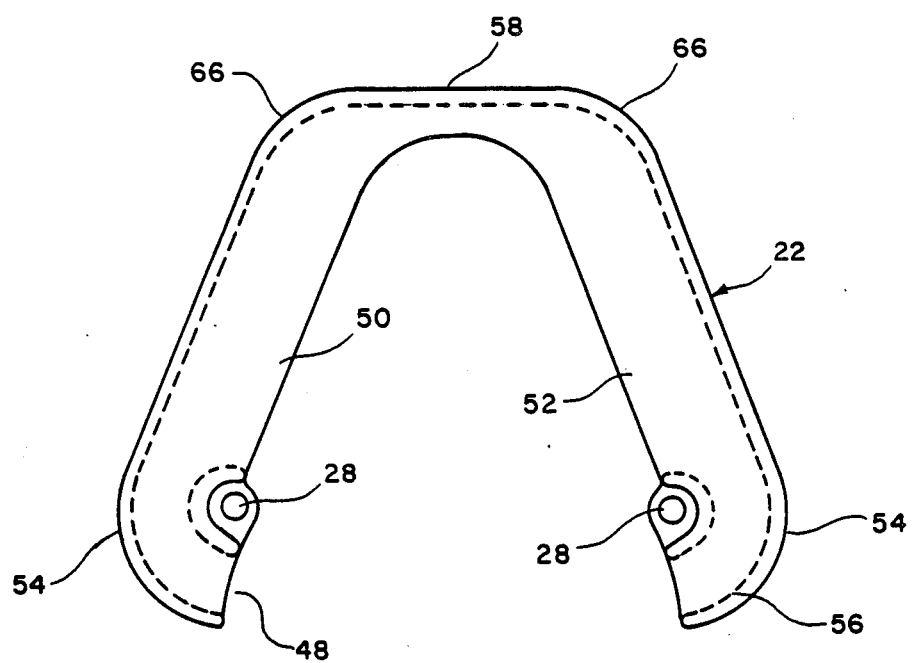
FIG. 9 is an end view of a single corona shield.

FIGS. 8 and 9 show a corona shield 22 unassembled from a transmission line subassembly. FIG. 9 illustrates the corona shield 22 as a substantially truncated, triangularly shaped member having three sides, and an open side. Open area 48 shown in FIG. 9 is open with respect to the remainder of the corona shield 22 and is formed by legs 50 and 52 projecting upwardly from top side 58. Circular openings 28 are shown disposed towards the inner portions of legs 50 and 52 to receive bolts 26 for securing to collars 16 of a terminal or other assembly. In one embodiment, from the centerpoint of openings 28, outer bend 54 has a radius of two inches. The inner bend 56 has a radius of 1-11/16 inches. The width of the corona shield 22 at its widest point, between the outer bend 54 of leg 50 and the outer bend 54 of leg 52 is 11¾ inches. Since the individual widths of legs 52 and 54 are approximately 2 inches with the remainder of the overall width therebetween left open, it is seen that the corona shield 22 has a substantial, inner area that is left open. Top side 58 of corona shield 22 is substantially shorter in length than the base open side 48, this provides a more compact arrangement when mounted over a transmission line subassembly and further provides rounded edges 66 adjacent top side 58 to further protect from the effects of corona.

FIG. 8 illustrates the corona shield 22 in side view showing the bend of the shield 22 from the base portion of leg 50 to the top side 58. From the base of leg 50 to the top of top side 58 the corona shield is 11⅝ inches. The inner wall 60 shown in FIG. 8 defines the interior portion of corona shield 22 and through the interior portions of the corona shield 22 is ¼ inch in width from the exterior wall 62. However, the outermost ends 64 of the corona shield 22 have an increased thickness to 5/16 of an inch to allow the ends to be further bent and rounded to additionally protect from the effects of corona. It should be noted in both FIGS. 8 and 9 that no sharp edges are provided in the present design. Thus, the effects of corona are minimized if not eliminated altogether. The material of corona shield 22 in the preferred embodiment is 356-F non-heat-treated aluminum. This material may be molded, and since each corona shield 22 of the four shields in an assembly is identical to the others, the same mold may be used for each shield 22 without regard to its placement on the assembly. This design thus provides a means for protecting from the effects of corona which is lightweight and economical to manufacture. In addition, the present design is easily installed and allows ready access to the transmission line assembly for maintenance and inspection. Further, the present design reduces inventory space requirements when in storage. The above description and dimensions are for use with a particular transmission line subassembly, such as the expansion terminal assembly shown in FIG. 1. Slight variations may be made in the dimensions, widths and thicknesses of the corona shield 22 to accommodate other designs and other transmission line assemblies. Thus, the invention is not limited to the particular details of the method or apparatus depicted and other modifications and applications are contemplated. Certain other changes may be made in the above-described apparatus without departing from the true spirit and scope of the invention herein involved. It is intended, therefore, that the subject matter in the above description shall be interpreted as illustrative and not in a limiting sense.

I claim:

1. A transmission line with apparatus for protecting it from the effects of corona, said transmission line having a bus and a terminal for said bus, said apparatus comprising a pair of circular collars, one collar mounted over the bus and the other collar mounted over the terminal, a flexible strap connecting each collar to the other such that said flexible strap provides a means for allowing for thermal expansion and contraction of the bus and providing a mechanical and electrical connection, a pair of corona shields oppositely mounted to each collar and each collar having means for mounting thereto said oppositely mounted, corona shields, each such corona shield having three sides including a top side and a pair of legs angularly extending therefrom, where said top side has a length which is less than the distance between the legs at the ends of said legs such that the corona shield forms a substantially truncated, V-shaped member, each leg having an opening therein for cooperating with the collar mounting means and for mounting the shield to said collar; each said top side of each said corona shield extending over said transmission line between the collars and towards the oppositely mounted collar, such that the corona shields extend substantially over the bus and terminal.

2. The combination of claim 1 where each corona shield has rounded edges where the legs join the top side of the shield and rounded edges where the legs are mounted to the collar, at their outermost ends.

3. The combination of claim 1 where each corona shield is manufactured of non-heat-treated aluminum.

4. The combination of claim 1 where the legs and top side of the shields are substantially flat, having rounded edges along the entire lengths and widths thereof.

5. The combination of claim 1 where the legs and top side of the individual corona shields form an open area therebetween and said open area comprises a relatively substantial area with respect to the overall area of the shield.

6. The combination of claim 1 where each corona shield is identically formed to the other corona shields and each corona shield is mounted on the transmission line such that another corona shield is oppositely mounted on the same side of the transmission line, on the same collar, and such that still another corona shield is oppositely mounted on the opposing side of the transmission line on the other collar.

7. A corona shield for protecting a transmission line subassembly from the effects of corona, said shield comprising a member having three sides and a substantially truncated, V-shape, said member having a top side and two legs projecting outwardly therefrom on a same side thereof and at obtuse, inner angles therefrom; the outer and inner sides formed at the juncture of the top side and the legs being rounded and the bottom portions of the legs being rounded, each of said legs having a curve therein such that the top side projects away from the bottom of the legs; each said leg having at the bottom thereof means for securing the member to a transmission line subassembly such that the top side of the member will project over a transmission line subassembly when mounted thereto and thereby protect a portion of the transmission line subassembly from the effects of corona.

8. The corona shield of claim 7 where each means for securing the member to the transmission line subassembly comprises an opening for receiving therein a threaded bolt for connection with a like opening in the transmission line subassembly.

9. The corona shield of claim 7 where the member is comprised of non-heat-treated aluminum.

10. A transmission line with apparatus for protecting it from the effects of corona, said transmission line having a juncture where said juncture comprises two tubular busses connected by a support, said apparatus comprising a pair of circular collars, one collar mounted over a bus on one side of the juncture and the other collar mounted over the other bus on the other side of the juncture, a flexible strap connecting each collar to the other such that said flexible strap provides a means for allowing for thermal expansion and contraction of the busses and providing a mechanical and electrical connection between the two busses, a pair of corona shields oppositely mounted to each collar and each collar having means for mounting thereto said oppositely mounted corona shields, each such corona shield having three sides including a top side and a pair of legs angularly extending therefrom, where the length of the top side of each shield is less than the distance between the legs at the ends thereof such that said shield forms a substantially truncated V-shaped member, each leg having an opening therein for cooperating with the collar mounting means and for mounting the shield to said collar; each corona shield extending over said juncture between the collars such that the corona shields extend substantially over the bus juncture.

11. The combination in claim 10 where each corona shield has rounded edges where the legs join the top side of the shield and rounded edges where the legs are mounted to the collar, at their outermost ends.

12. The combination of claim 10 where each corona shield is manufactured of non-heat-treated aluminum.

13. The combination of claim 10 where the legs and top side of the shields are substantially flat, having rounded edges along the entire lengths and widths thereof.

14. The combination of claim 10 where the legs and top sides of the individual corona shields form an open area therebetween and said open area comprises a relatively substantial area with respect to the overall area of the shield.

* * * * *